United States Patent
Furtaw

[19]

[11] Patent Number: 5,848,359
[45] Date of Patent: Dec. 8, 1998

[54] HIERARCHICAL SET OF FREQUENCY REUSE PATTERNS ALLOWING CELLULAR AIR AND LAND COMMUNICATION

[75] Inventor: Robert W. Furtaw, Lake Zurich, Ill.

[73] Assignee: Motorola, Inc., Schaumburg, Ill.

[21] Appl. No.: 963,323

[22] Filed: Nov. 3, 1997

Related U.S. Application Data

[63] Continuation of Ser. No. 524,663, Sep. 8, 1995.

[51] Int. Cl.$^6$ ..................................... H04Q 7/00
[52] U.S. Cl. ................... 455/447; 455/446; 455/428; 455/422; 455/431
[58] Field of Search .................... 455/447, 446, 455/428, 422, 431

[56] References Cited

U.S. PATENT DOCUMENTS

| | | | |
|---|---|---|---|
| 5,067,172 | 11/1991 | Schloemer | 455/54.1 X |
| 5,123,112 | 6/1992 | Choate | 455/56.1 |
| 5,289,527 | 2/1994 | Tiedemann, Jr. | 455/33.1 X |
| 5,365,571 | 11/1994 | Rha et al. | 455/33.1 X |
| 5,519,761 | 5/1996 | Gilhousen | 379/59 |
| 5,557,656 | 9/1996 | Ray et al. | 379/60 X |
| 5,574,968 | 11/1996 | Olds et al. | 379/60 X |

*Primary Examiner*—David R. Hudspeth
*Assistant Examiner*—Daniel Abebe

[57] ABSTRACT

A cellular system (FIG. 4) is expanded to allow communication between mobile ground-based units (70 and 72) and mobile air-based units (80 and 78) where the air base units (e.g., a unit in airplane 78) operate above a threshold elevation. Mobile units below the threshold elevation level use local conventional cellular service area and cells whereas mobile units above the threshold are transferred to a frequency reuse pattern having a higher altitude of service and a larger service surface area. Switching between the air cells (41a–41g) and the land cells (26) is performed by determining if two land cell controllers operate at a same frequency both are receiving transmission from the mobile unit. If two land cells of the same frequency receive the same mobile unit transmission, then the mobile unit is above the threshold elevation and assigned to an air cell, else a land cell is used.

19 Claims, 6 Drawing Sheets

HIERARCHICAL SET OF FREQUENCY REUSE PATTERNS ALLOWING CELLULAR AIR AND LAND COMMUNICATION

This application is a continuation of prior patent application Ser. No. 08/524,663 filed Sep. 8, 1995.

FIELD OF THE INVENTION

The present invention relates generally to communication systems, and more particularly, to cellular systems that support both air and land communications.

BACKGROUND OF THE INVENTION

FIG. 1 illustrates a cellular telephone communication system. FIG. 1 illustrates a plurality of service cells distributed over a geographical surface area. This cell's structure is hierarchical and utilizes frequency reuse patterns to efficiently limit the entire frequency bandwidth required to perform cellular communications on a nation-wide or world-wide basis. At the highest hierarchical level, the cellular system covers a global surface area wherein the global surface area is represented by the entire FIG. 1. Lower in the hierarchy are cells referred to as frequency reuse patterns. One frequency reuse pattern is illustrated in FIG. 1 as reuse pattern 26 which contains cells A, B, C, and D. Each of these middle tier cellular cells, A, B, C, and D individually has further hierarchical subdivision cells wherein these smaller cells within A, B, C, and D operate using different frequencies of operation to avoid frequency collisions. In other words, cell A contains six subcells 1 through 6 where each cell 1 through 6 operates at a different frequency.

Laterally adjacent cells within the communications system of FIG. 1, utilize different communication frequencies so that interference between cells is minimized. For example, cell 1 in FIG. 1 may use a frequency of 875 MHz, whereas cells 6 through 2 would surround cell 1 use frequencies other than 875 MHz to communicate. Cells B, C, and D are similar to cell A in that each cell contains six subcells which communicate cellular messages, via different frequencies which do not conflict with one another. Therefore, cells B through D illustrate eighteen other frequency regions labeled as regions 7 through 24. Therefore, cells A, B, C, and D form a pattern which can be duplicated across a larger area in a manner wherein same frequencies are separated from one another by an adequate enough distance so that interference between similar cells with similar frequencies is not a problem. Therefore, via frequency reuse, the same frequencies can be used at several sites within a city or local region to communicate cellular information in a non-conflicting manner due to distance separation.

The service area of the cells A, B, C, or D in FIG. 1 typically have radii on the order of one to five miles. Therefore, an automobile or like cellular mobile unit within cell 1 can request to transmit vocal information via a phone call to another cell, for example cell 22, through the network communications and cells illustrated in FIG. 1. When a mobile unit requests to send a message, only one cell or adjacent cells having different frequencies are able to detect the mobile unit due to the mobile unit's close proximity to the surface of the earth. When two adjacent cells having different frequencies detect the mobile land unit, the one cell receiving the appropriate signal processes the call/request. When the mobile land unit is close to the ground, no cells which have the same frequency in the system of FIG. 1 receive the same signal from the mobile land unit. As the mobile unit rises in elevation, for example, as the mobile unit rises in a high-rise building or is being elevated via air travel, the signal transmitted by the mobile unit can be received by "same frequency" multiple cells thereby creating confusion in the cellular system rendering communication impossible.

This elevation limitation limits the use of the current cellular systems. A need exists to allow for cellular communication on a global scale by allowing communication from tall buildings and aerial borne vehicles.

FIG. 2 illustrates cells 12, 4, and 11 from FIG. 1. FIG. 2 is used to illustrate that current systems overlap cell service areas so that a car, such as car 37 can transfer or travel from one cell to another and allow for continuous communication coverage. When the mobile units 34, 36, 37, 38, 39, and 40, are close to the ground level, communication through the service areas 11, 12, and 4 via the antenna's base stations 28, 30, and 32 is possible.

Figure 1:
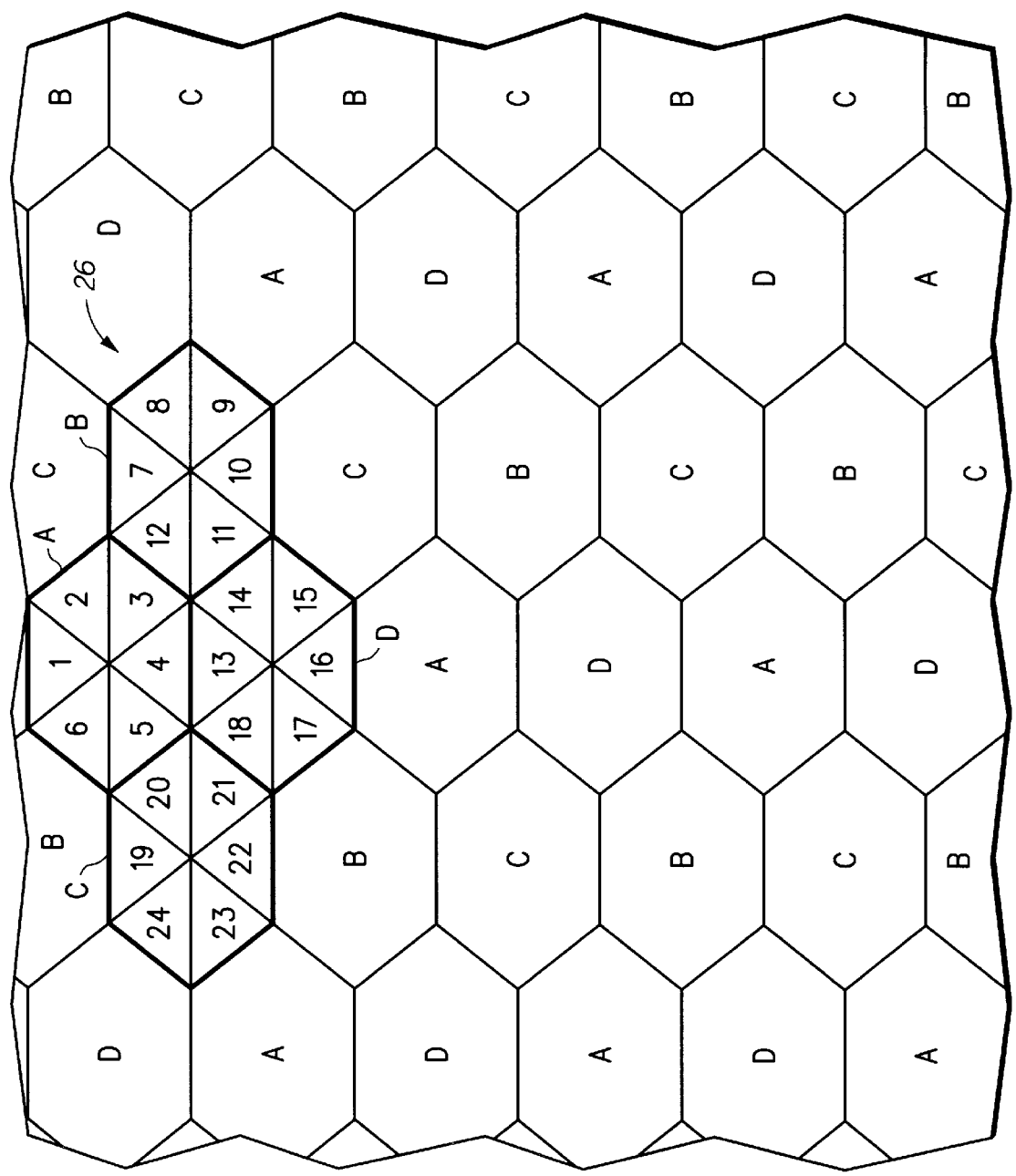
FIG. 1 illustrates, in a top perspective view, a known method for creating a frequency use pattern and system for a ground-based cellular system.

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

DESCRIPTION OF A PREFERRED EMBODIMENT

Generally the present invention teaches a cellular system and a method for allowing cellular subscribers to communicate not only with ground based mobile units, but also with mobile units located in high-rise buildings and in airborne travel vehicles such as commercial airplanes. In general, when a mobile unit transmits a request to use a cellular network, the mobile unit request is received by only one base unit operating at a particular frequency in the communications system. It is important to note that ground based mobile unit transmission that are close to the ground are not simultaneously transmitting a message that can be received by more than one cell having the same frequency.

As the mobile unit rises in elevation, it becomes possible for the mobile unit to communicate across a wider range of surface are thereby allowing multiple cells of FIG. 1 which operate using the same frequency to detect the transmission from the mobile unit. In conventional systems, the detection of an initial message from a mobile unit by multiple cells operating in the same frequency results in the communications system not functioning properly. In the description below, this dual reception of an initial message by two or more cells using the same frequency, is used to allow for detection of mobile units that rise above a threshold elevation thereby allowing proper switching of base stations to allow communication between cellular mobile units in the air (above the threshold) and cellular mobile units located on the ground (below the threshold).

Specifically, when two cells within the communication system which operate at a same frequency receive an incoming request for cellular services from a same mobile unit, the cells having the same frequency either communicate to each other or communicate to a central controller to determine if multiple sites having the same frequency have received the initial message. If no other site having a same frequency of operation has received similar information from a mobile unit, then the origination of the message was from the ground (below the threshold) and normal communication channels cells and base stations can be utilized. If two or more sites having the same frequency detected the initial transmission from the mobile unit, then the handling of the transmission is transferred to an upper hierarchical level and a different base station operating at a frequency which is different from any frequency within the ground based cellular system so that the air based mobile unit can communicate in the cellular structure above the threshold level.

Figure 2:
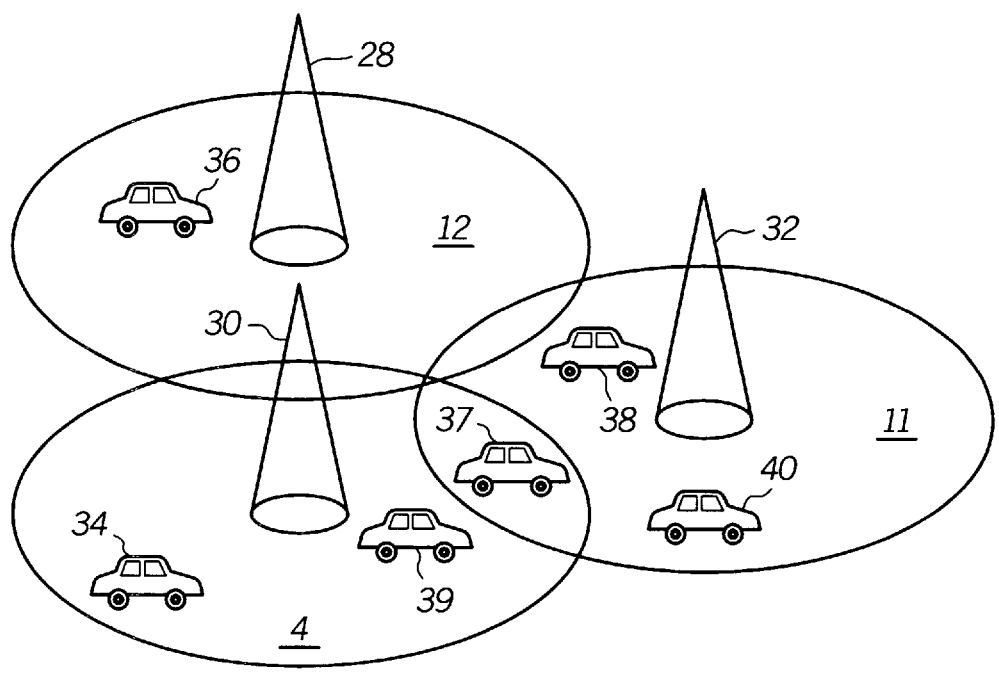
FIG. 2 illustrates, in a three-dimensional diagram, a known method for overlapping cell coverage areas for continues service while traveling.
Figure 3:
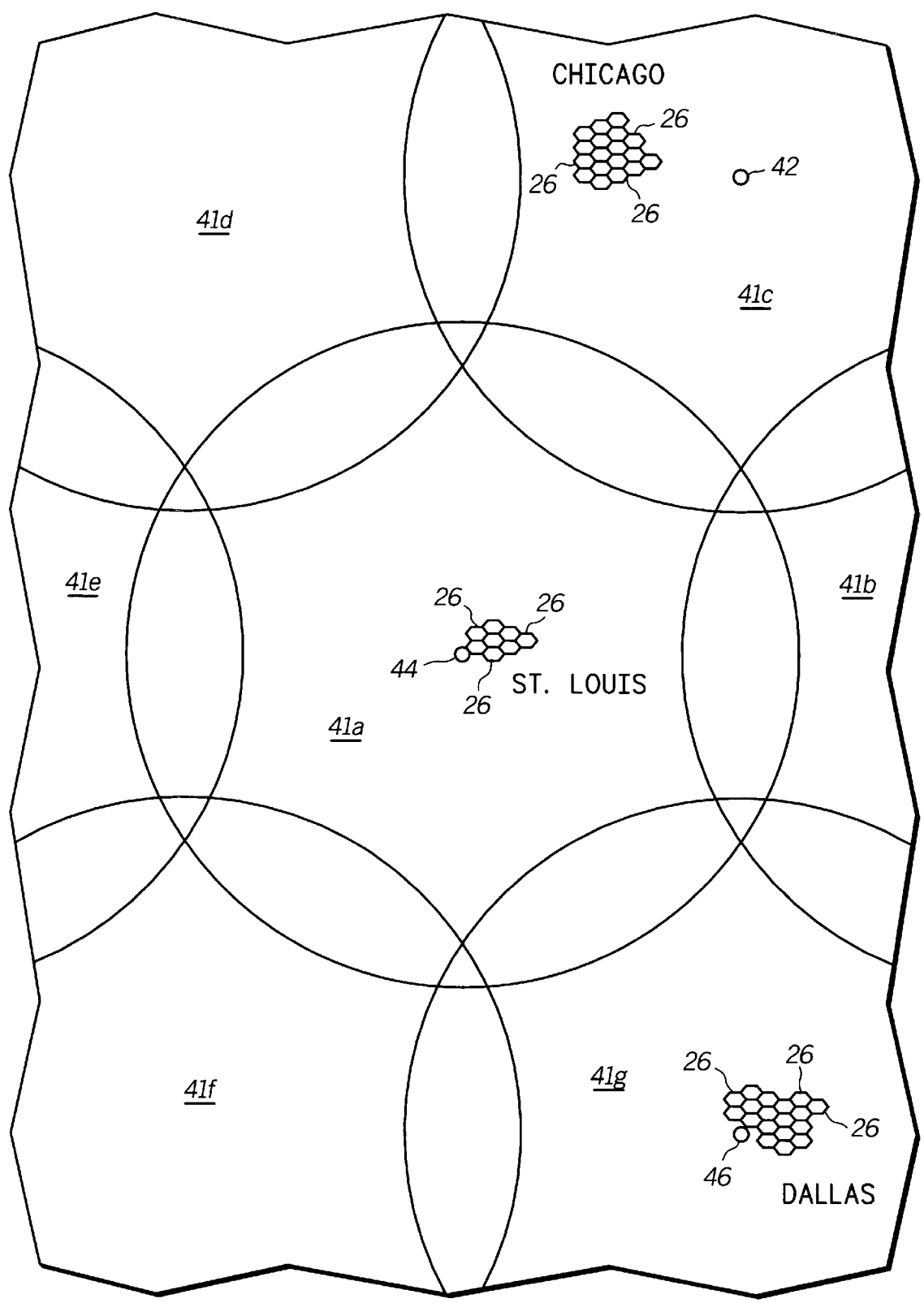
FIG. 3 illustrates, in a top perspective view, a land-mobile and air cellular cell hierarchical structure in accordance with the present invention.

FIG. 3 illustrates a system which allows ground based mobile cellular units to communicate with air based or elevated cellular units. FIG. 3 illustrates three conventional cellular systems as illustrated in FIG. 1. These three conventional cellular systems are listed in FIG. 3 as being Chicago, St. Louis, and Dallas. Each of these cities (Chicago, St. Louis, and Dallas) contain multiple frequency reuse patterns 26 as illustrated in FIG. 1. It is these cells 26 that allow conventional communications from ground-based mobile unit to ground-based mobile unit. Once the unit has crossed a threshold elevation and is being received two separate cells having a same operational frequency within the local city cite, the transmission control is transferred to a larger frequency reuse pattern illustrated by cells 41a through 42g in FIG. 3. The cells with larger surface area and larger elevation coverage which are labeled as cells 41a through 41g are controlled by controllers separate from the controllers of FIG. 2, which are used by the smaller cells in the cities, and are illustrated in FIG. 3 as being controllers 42, 44, and 46.

FIG. 3 illustrates that the controllers 42, 44, and 46 may be an integral part of the local cellular system (in close proximity to the local city system) or may be a separate unit separated from the local system by many miles. Given the system of FIG. 3, it is possible for a mobile unit to initiate a phone call at an upper elevation and be directly assigned to one of the cells 41A through 41G. In another form, it is possible for communication to be initially started and controlled by a local city cell within pattern 26 and then subsequently be transferred to a cell 41A through 41G as the elevation of the mobile unit increases. In addition, the opposite is true wherein a mobile unit may be decreasing in elevation and thereby result in being switched, for example, from a service area 41C to a cell pattern 26 in the Chicago region.

Figure 4:
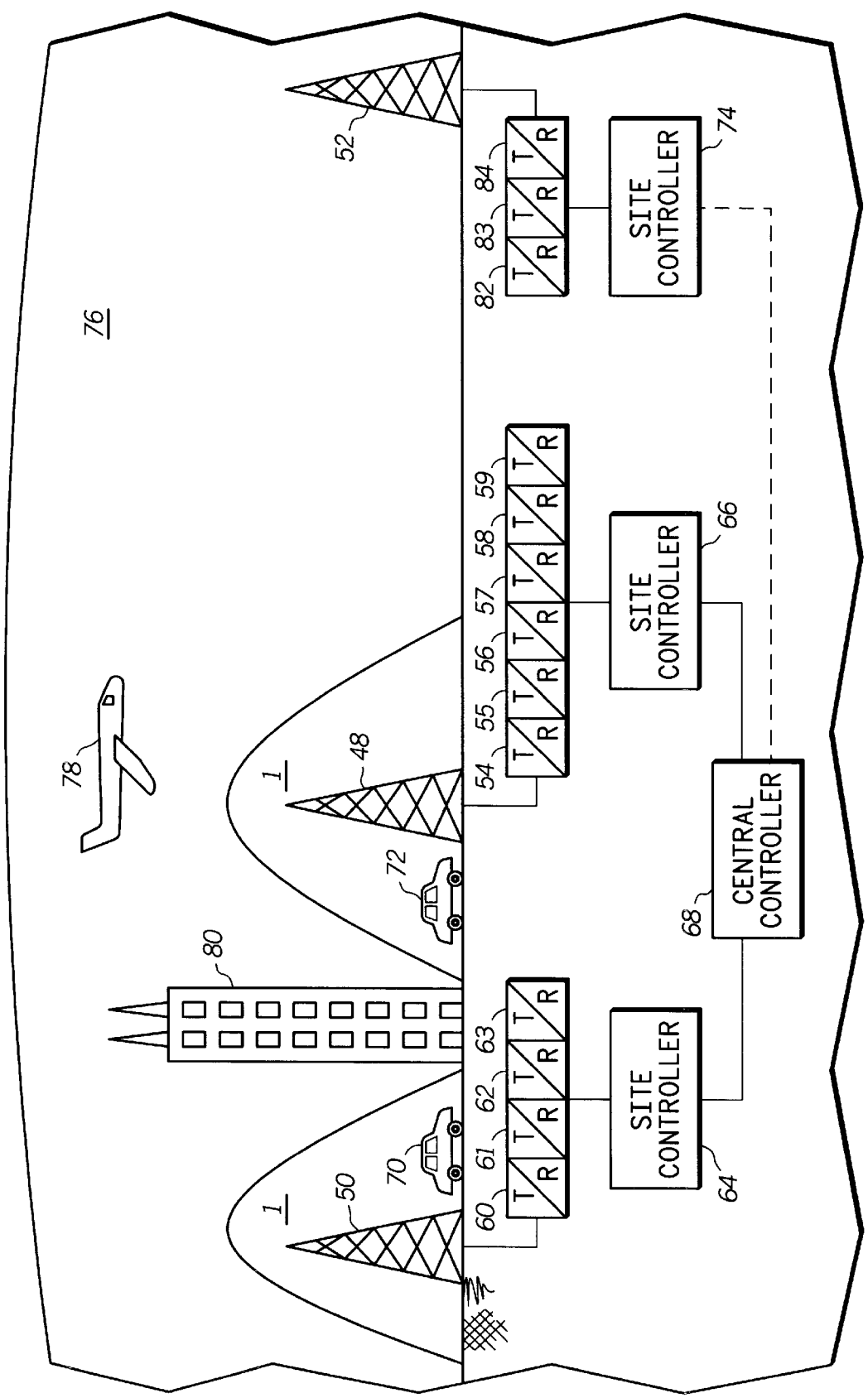
FIGS. 4 illustrates, in a cross-sectional and block diagram depiction, a system for implementing a portion of the system of FIG. 3 in accordance with the present invention.

FIG. 4 illustrates a portion of the communication system illustrated in FIG. 3 in more detail. FIG. 4 illustrates two service areas labeled cells 1. These two cells 1 operate on a same frequency and are analogous to the cells 1 in FIG. 1. The two cells 1 in FIG. 4 are separated by a distance (i.e., are non-overlapping) which is also in accordance with FIG. 1. The cells 1 indicate a service area through which the antennas 48 and 50 can communicate with accuracy and quality by using physical phone lines or cables or base station to base station relaying of information. Other cells operating with different frequencies are used in FIG. 4 and lie between and around the two cells 1 but are not illustrated in FIG. 4. The additional cells having different frequencies which are not illustrated in FIG. 4 are needed so that an automobile 70 having a mobile unit can communicate to an automobile 72 using a mobile unit via the service areas 1 and adjacent service areas utilizing different frequencies and so that all mobile units have continuous service while traveling.

The antenna 50 of the first service area 1 is coupled to a plurality of transmit and receive units labeled as transmission and receive units 60 through 63. One transmission and receive unit 60 is designated as a control unit whereas the other units 61 through 63 operate to control communications that are in progress. In other words, when any mobile unit within the left-most service area 1 requests to begin a communication using the communications system, the unit 60 processes this initial message and initial control information to set up a vocal communication or data communication on one of the channels 61 through 63. If multiple communications are scheduled by unit 50 on the units 61 through 63, then frequency multiplexing or time division multiplexing is used so that multiple mobile units can communicate through the antenna 50 in an efficient manner. The units 60 through 63 communicate with a site controller 64 which controls the overall operation of the left-most cell 1. The site controller 64 in turn communicates to a central controller 68 which controls the operation of a plurality of cells and/or a plurality of reuse patterns and can control switching from one cell to another as mobile units move along the ground.

The antenna 48 of the right-most cell 1 is also connected to transmit and receive units labeled as transmit and receive units 54 through 59. The transmit and receive unit 54 is a control unit which receives all incoming requests from mobile units and schedules these requests for functional operation on one of the other transmit and receive units 55 through 59. The site controller 66 communicates information between the units 54 through 59 and the central controller 68. Cells 1 in FIG. 4 are referred to as land-based cells. FIG. 4 illustrates an air communication or air based cell 76 (also referred to as a service area 76). The cells like cell 76 and including cell 76 typically allow for cellular communication at a higher altitude and allows for a larger coverage or service area than the cells 1 which are used locally as illustrated in FIG. 3 by frequency reuse pattern 26. Antenna 52 is used to receive and communicate information within the service area for cell 76. In one form, cell 76 is analogous to cell 41C in FIG. 3 wherein the cells 1 in FIG. 4 are local cells within Chicago.

Antenna 52 is coupled to a plurality of transmission and receive units labeled units 82 through 84. The units 82 through 84 communicate through a site controller 74. The site controller 74 is optionally coupled to the central controller 68. In another form, the central controller 68 may not be needed since the site controllers in FIG. 4 may be intercoupled via a local area network or a like media which results in a central controller being not needed.

In FIG. 4, if the mobile unit 70 requests a communication, then the antenna 50 receives this request whereas the antenna 48 will not receive this transmitted request. The units 48 and 50 communicate through the respective site controllers 66 and 64 to the central controller 68 to determine that only one cell operating on the same frequency received the initial control message from the unit 70. Once the central controller 68 determines that only one cell operating on the same frequency receive the initial message, then the central controller tells the one receiving cell to process the operation as a conventional ground based communication in a cellular format. If a transmission is initiated from a high-rise building 80 or an airplane 78, then two or more cells operating on the same frequency will receive the same initial message from the sources 80 and 78. In other words, the antennas 48 and 50 will both receive initial information and send this information to the central controller 68. Once the central controller 68 determines that two or more cells operating at the same frequency have received the same initial message from the same mobile unit, then the central controller can determine that the mobile unit is operating at an elevation above a threshold elevation.

The central controller 68 then tells one of the antennas 48 or 50 to communicate to the mobile unit located within location 80 or location 78. This communication is done to tell the mobile unit located above the threshold elevation to change its frequency to the frequency received by antenna 52. While one antenna 48 or 50 transmits this information, all other antennas of the same frequency are told by central controller 68 to ignore this new incoming information. The mobile unit which is located above the threshold elevation, then communicates with the base 52 on a different frequency to allow for communication to any of the other mobile units, such as 70 and 72, as well as other mobile units above the threshold elevation.

Figure 5:
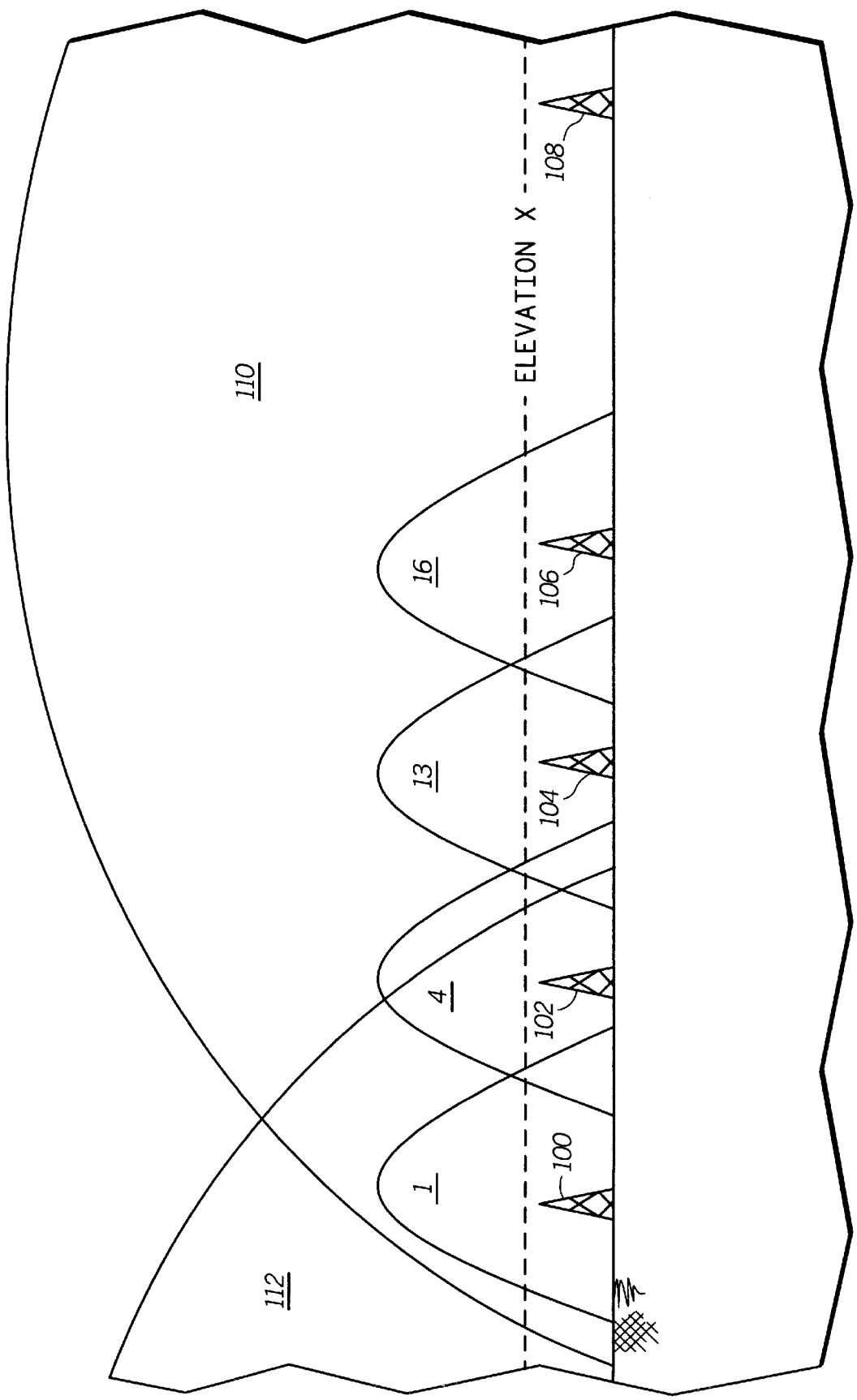
FIGS. 5 illustrates, in a cross-sectional depiction, a system for implementing a portion of the system of FIG. 3 in accordance with the present invention.

FIG. 5 illustrates the threshold elevation concept in another graphical format. The city wide smaller service area cells for mobile ground-based units are illustrated in FIG. 5 as cells 1, 4, 13, and 16 from FIG. 1. The cells 1, 4, 13, and 16 of FIG. 5 can handle all calls below the threshold elevation X with no difficulty. Once a mobile unit rises above the threshold elevation X (which can be varied by the size, strength, and design of the cells 1, 4, 13, and 16) a larger service area having a higher operation elevation is used such as cells 112 and 110. The base units 100, 102, 104, and 106 service the cells 1, 4, 13, and 16 respectively while the base unit 108 serves the cell 110.

Figure 6:
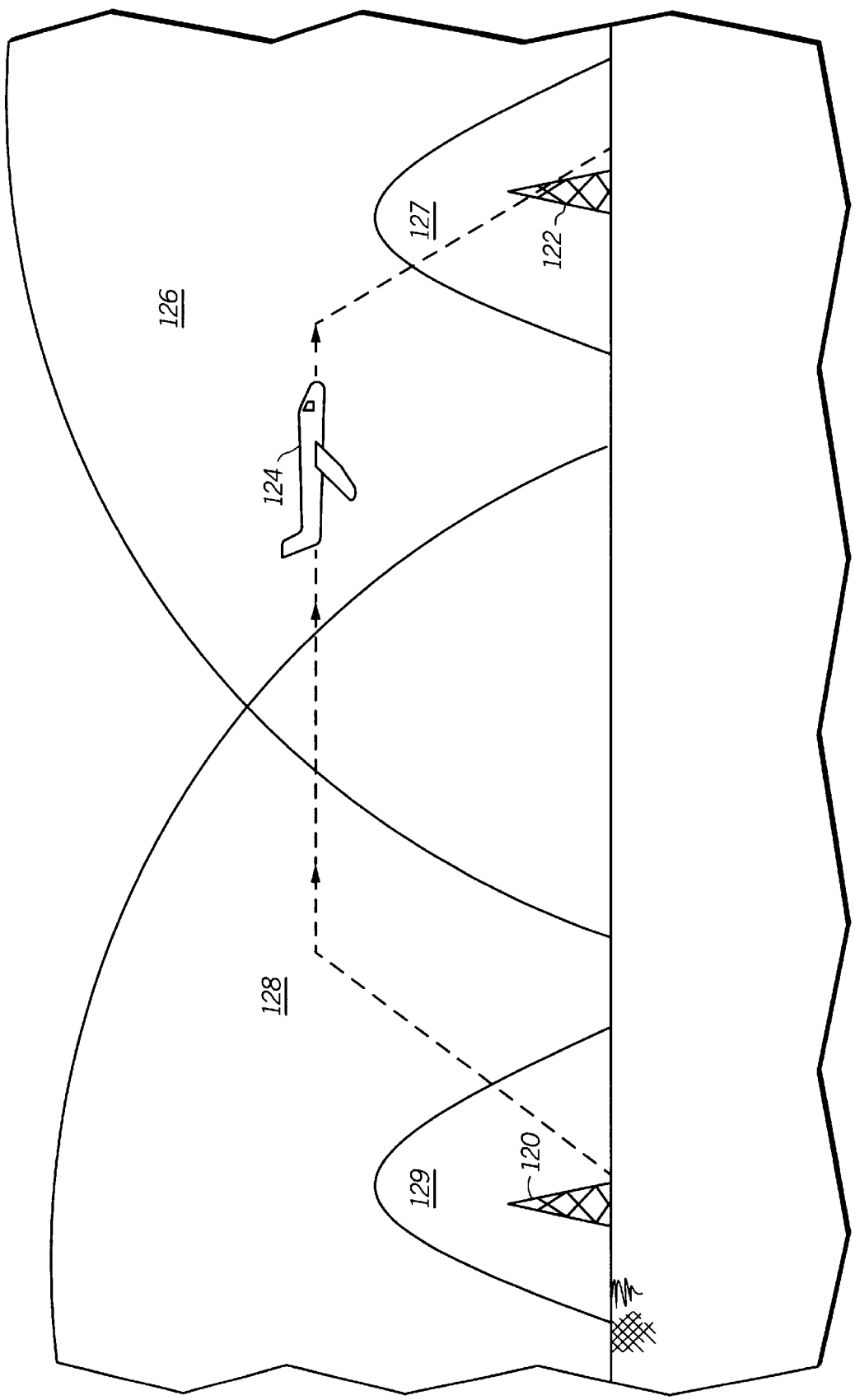
FIGS. 6 illustrates, in a cross-sectional depiction, a system for implementing air travel transfer of a call for continuous service through a portion of the system of FIG. 3 in accordance with the present invention.

FIG. 6 illustrates what occurs when an airplane takes off flies to another air cell and then lands all while a call, message, or data transfer is in progress from a mobile unit. Assume that the transmission is begun on the ground in an airplane 124 at an airport in cell 129 in Dallas. Cell 129 is controlled and monitored by a base unit 120. Unit 120 will receive the initial transmission from the mobile unit, determine it is on the ground as taught above (the plane has not taken off yet), and will set up the call as a conventional cellular operation using city or local cells as in FIG. 1. The plane will then take of and the plane 124 will cross the threshold elevation after a short time. Once this change in elevation above the threshold is detected by communication within the system to determine that two bases with the same frequency are receiving the same signals from/to the same mobile unit, to avoid confusion and failure of the local system, the handling of the mobile unit is transferred from the base unit of the land cell 129 to the base unit of the air cell 128.

The airplane continues to travel and crosses into another air cell 126. Cell 128 and 126 are air cells that can have a frequency reuse pattern similar to patter 26 of a ground based system with a much larger total service area. Cells 128 and 126, since they are adjacent, operate on different frequencies and operate at frequencies that do not interfere with any frequencies of local cells within their service area. Once the signal to the base station of cell 128 is weaker that the signal to the base station of cell 126, the call is switched from the base station of cell 128 to the base station of cell 126.

Once the plane descends for a landing below the threshold elevation, the signal is transferred from cell 126 to a cell 127 near the airport when no two cells in the local ground-based reuse pattern around the landing airport which have the same frequency are receiving the same signals from the same mobile unit in the plane 124.

The procedure taught above may only be performed in part if the call is begun in the air or is terminated before landing.

While the present invention has been illustrated and described with reference to specific embodiments, further modifications and improvements will occur to those skilled in the art. For example, other communication systems besides cellular systems can use the air/land teachings herein. Another third hierarchical layer can be placed above the air cells 128 and 126 in FIG. 6 to allow for communication with very high flying vehicles. Plurality used herein means any possible value between 2 and infinity and should not be limited to any one sub-range or constant. It is to be understood, therefore, that this invention is not limited to the particular forms illustrated and that it is intended in the appended claims to cover all modifications that do not depart from the spirit and scope of this invention.

What is claimed is:

1. A method for using an appropriate frequency reuse pattern based upon altitude, the method comprising the steps of:

receiving a first message from a first source containing control information in a first cell within a service area;

monitoring the first cell and a second cell, the first cell and the second cell being non-adjacent and operating at the same frequency, to determine if the first message is received by both the first cell and the second cell, wherein the first source is operating above a predetermined elevation when the first message is received by both the first cell and the second cell; and transmitting a second message to the first source informing the first source to change frequency to a new frequency which is part of a new reuse pattern.

2. The method of claim 1 wherein the step of transmitting comprises:

transferring a handling of a communication from the source from the first cell to a second cell wherein the first and second cells have different service area.

3. The method of claim 2 wherein the step of transferring comprises:

transferring the handling of the communication from the source from the first cell to a second cell wherein the second cell has a service area larger than the service area of the first cell.

4. The method of claim 1 wherein the step of transmitting comprises:

transferring a handling of a communication from the first source from the first cell to a third cell wherein the first and third cells operate at a different frequency.

5. The method of claim 4 wherein the step of transmitting comprises:

providing a plurality of cells which surround the third cell, the plurality of cells operating at a frequency different from the third cell and having service areas larger than the first and second cells.

6. The method of claim 5 wherein the step of providing comprises:

switching from the third cell to a fourth cell which is within the plurality of cells, the fourth cell being adjacent the third cell and having a service area which is larger than the service area of either the first or second cell.

7. The method of claim 4 wherein the step of transmitting comprises:

switching from the first cell to the third cell in the communication system so that the source located on an airplane can converse with a cellular phone located at a location other than the airplane.

8. The method of claim 1 wherein the step of transmitting comprises:

transferring a handling of a communication from the first source to a second cell wherein the first cell controls transmissions when the transmissions are originated from below the predetermined elevation and the second cell controls transmissions when the transmissions are originated from above the predetermined elevation.

9. The method of claim 1 wherein the step of communicating comprises:

communicating between the first and second cells wherein the first and second cells are part of a larger plurality of cells which use many different frequencies for processing transmissions, each cell in the plurality of cells which uses the same frequency being adjacent no other cell using the same frequency but instead being surrounded by cells having a different frequency.

10. A method for assigning a handling of a transmission to one network node within a plurality of network nodes in a communication system, the method comprising the steps of:

receiving at least a portion of the transmission in a first network node of the communication system, the first network node having a first area of transmission coverage;

determining if a second non-adjacent network node having the same frequency as the first network node detects the transmission simultaneously with the first network node; and transferring, when the second network node and the first network node detect the transmission, the handling of the transmission from the first network node to a third network node wherein the third network node has a second area of transmission coverage which is greater in area than the first area of transmission coverage.

11. The method of claim 10 wherein the step of determining comprises:

providing first and second network nodes which operate at a same frequency.

12. The method of claim 11 wherein the step of providing comprises:

providing first and second network nodes which are physically separated by a fourth network node wherein the fourth network node operates at a frequency different from the first and second network nodes.

13. The method of claim 10 wherein the step of receiving at least a portion of the transmission in a first network node comprises:

receiving the transmission in a first network node wherein the first and second network nodes are positioned in a first frequency reuse pattern wherein the communication system contains several nodes, including the first and second nodes, which operate at a same frequency wherein no two nodes operating on the same frequency are directly adjacent one another.

14. The method of claim 13 wherein the step of transferring comprises:

transferring to the third network node wherein the third network node is located within a second frequency reuse pattern having a larger total reuse coverage area than the first frequency reuse area.

15. The method of claim 10 wherein the step of transferring comprises:

transferring to the third network node wherein the third network node is located within a first frequency reuse pattern wherein the communication system contains several nodes, which includes the third node, which operate at a same frequency wherein no two nodes operating on the same frequency are directly adjacent one another and all nodes operating on the same frequency are adjacent at least one different node operating at a different frequency.

16. The method of claim 10 wherein the step of transferring comprises:

transferring to the third network node wherein the third network node handles transmission originating above a certain altitude and the first and second nodes handle transmission originating below the certain altitude.

17. The method of claim 10 wherein the step of transferring comprises:

communicating control signals to a source of the transmission to inform the source to change frequencies so that communication can occur between the third network node and the source.

18. A method for dynamically routing control of a transmission between a plurality of network nodes in a communication system, the method comprising the steps of:

receiving the transmission from a source and initially processing a first portion of the transmission through a first network node of the communication system;

determining when the source exceeds a predetermined elevation by detecting wherein two cell receivers receive a common signal to determine when the source of the transmission rises above a certain altitude; and transferring, when the source rises above the certain altitude, the transmission to a second network node in the plurality of network nodes wherein the second network node handles a second portion of the transmission which follows the first portion of the transmission.

19. The method of claim 18 further comprising the steps of:

further monitoring the elevation of the source after the source has risen above the certain altitude, the further monitoring being used to detect when the source of the transmission is received by two receiving cells having the same frequency; and transferring, when the source falls below the certain altitude, the transmission to a second network node in the plurality of network nodes wherein the second network node handles a second portion of the transmission which follows the first portion of the transmission.

* * * * *